United States Patent
Ito et al.

(10) Patent No.: US 6,518,959 B1
(45) Date of Patent: Feb. 11, 2003

(54) DEVICE FOR DETECTING AND INPUTTING A SPECIFIED POSITION

(75) Inventors: Takahiro Ito, Nagoya (JP); Yasuhiko Saka, Nagoya (JP)

(73) Assignee: Ricoh Company, Ltd., Tokyo (JP)

( * ) Notice: Subject to any disclaimer, the term of this patent is extended or adjusted under 35 U.S.C. 154(b) by 185 days.

(21) Appl. No.: 09/650,156

(22) Filed: Aug. 28, 2000

(30) Foreign Application Priority Data

Sep. 10, 1999 (JP) ............................................. 11-258077

(51) Int. Cl.[7] ................................................. G09G 5/00
(52) U.S. Cl. ....................................................... 345/175
(58) Field of Search ................................ 345/150–153, 345/156, 179, 175, 173; 250/221; 362/31

(56) References Cited

U.S. PATENT DOCUMENTS

| | | | | |
|---|---|---|---|---|
| 4,205,304 A | * | 5/1980 | Moore | 340/365 |
| 5,164,585 A | * | 11/1992 | Lieu | 250/221 |
| 6,362,468 B1 | * | 5/2000 | Murakami et al. | 250/221 |
| 6,352,351 B1 | * | 6/2000 | Ogasahara et al. | 362/31 |
| 6,100,538 A | * | 8/2000 | Ogawa | 250/559.29 |

FOREIGN PATENT DOCUMENTS

| | | | | |
|---|---|---|---|---|
| JP | 2000-298552 | * | 10/2000 | G06F/3/033 |
| JP | 2001-228973 | * | 8/2001 | G06F/3/033 |

* cited by examiner

*Primary Examiner*—Amare Mengistu
(74) *Attorney, Agent, or Firm*—Oblon, Spivak, McClelland, Maier & Neustadt, P.C.

(57) ABSTRACT

The coordinate-position input device comprises a substantially flat surface for specifying a desired position using a pointing tool. A reflecting member is provided around this surface. A light emitter emits a flux of light of desired thickness over the entire surface towards the reflecting member. The light flux is such that it is thicker near the reflecting member and becomes thinner and thinner as it goes away from the reflecting member. That is, the light flux diverges as it approaches the reflecting member.

9 Claims, 14 Drawing Sheets

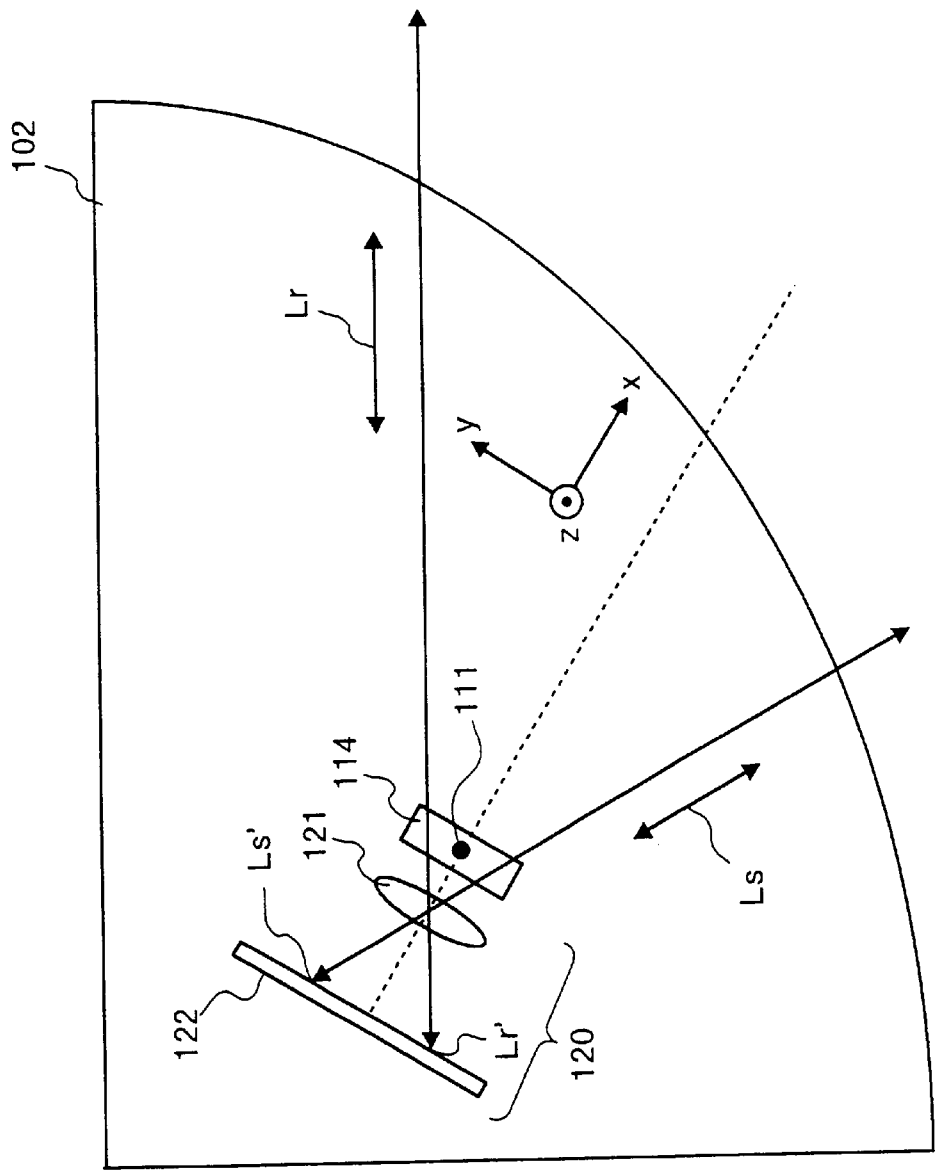

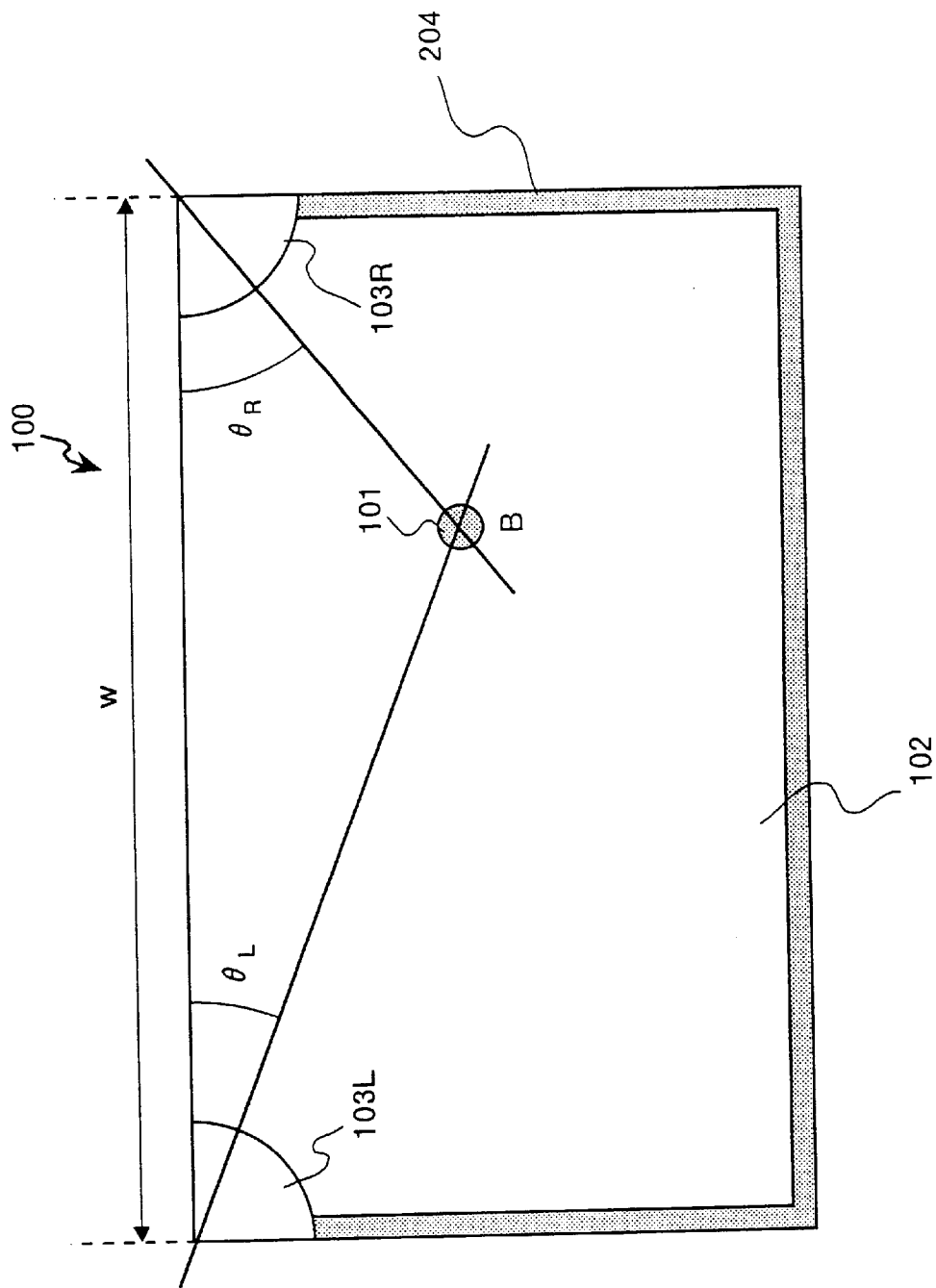

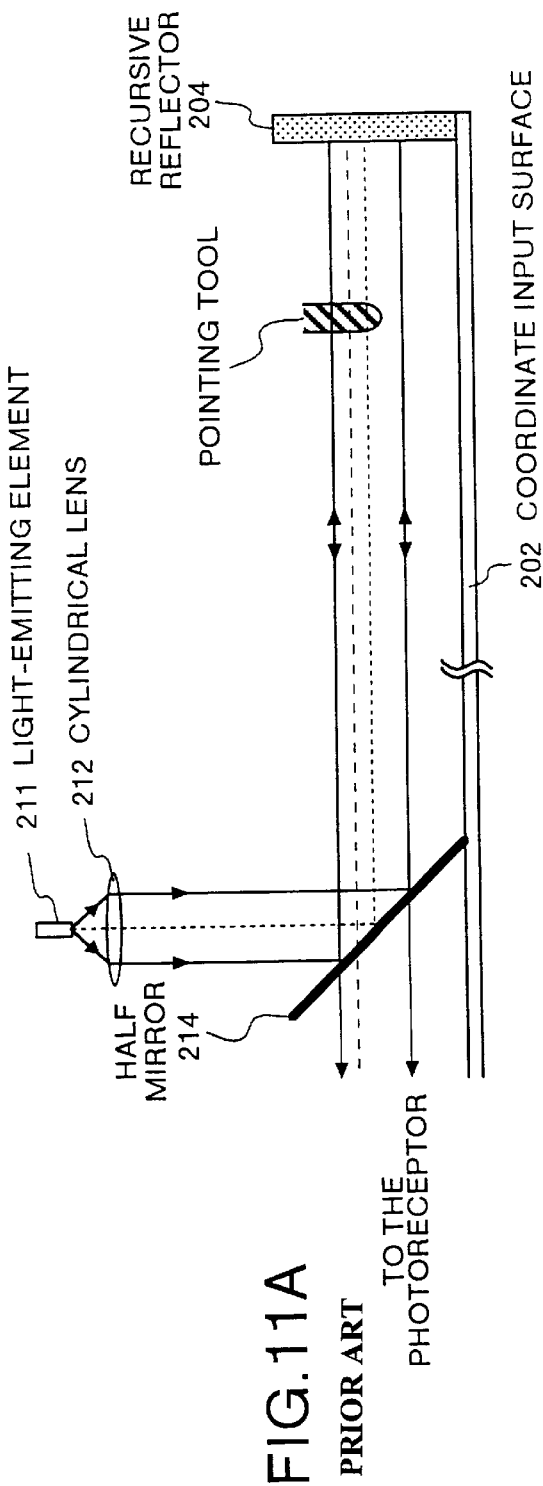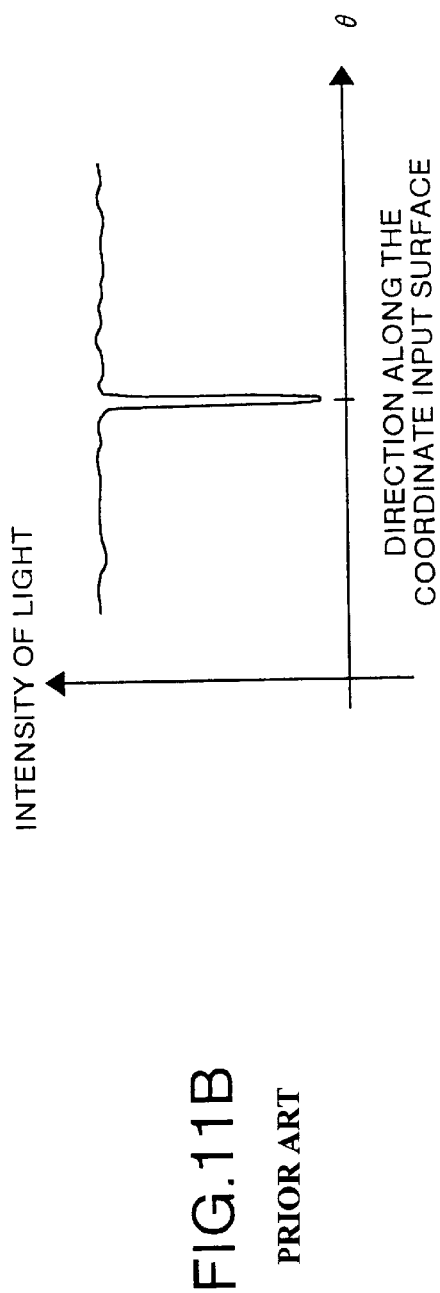
FIG.11A PRIOR ART
FIG.11B PRIOR ART

DEVICE FOR DETECTING AND INPUTTING A SPECIFIED POSITION

FIELD OF THE INVENTION

The present invention relates to a device which optically detects the coordinates of a specified position, thereby it can be used to draw images, write text on electronic boards or the like. More particularly, this invention relates to a device in which a probe beam is emitted towards a reflecting member, probe beam reflected from the reflecting member are received, and the coordinates of the specified position is detected based on the intensity of the received light.

BACKGROUND OF THE INVENTION

As a conventional device which optically detects the coordinates of a specified position and inputs the detected coordinates to some other device (hereafter referred to as coordinate-position input device), there is one comprising a light emitter that emits a probe beam (irradiation light), a reflector that reflects the probe beam emitted by the light emitter, and a light receiver that receives and converges the probe beam reflected by the reflector. The radiated light is a flux of collimated light beam which is parallel but at a certain height from a coordinate input surface (a whiteboard or a blackboard).

FIG. 9 schematically shows the conventional coordinate-position input device 200. FIG. 10 schematically shows the light receiver when viewed from the vertical direction with respect to the coordinate input surface 202. A light reception/emission section 203 is provided in this coordinate-position input device 200. This light reception/emission section 203 comprises a light emitter that emits irradiation light (probe beam) along the coordinate input surface 202, and a light receiver 220 that receives the reflected light. The light emitter is not specifically shown in these figures. A recursive reflector 204 is provided on the three sides of the coordinate input surface 202. This recursive reflector 204 comprises a reflection plate that reflects an incoming probe beam recursively to the direction from which light came in. The light emitter comprises a light-emitting element that emits irradiation light, and a cylindrical lens that converges or diffuses the irradiation light emitted by the light-emitting element in a prescribed direction of its travel. The functions of this light emitter will be explained in detail later. The light receiver 220 comprises a light receiving lens 221 that receives and converges the reflection light, and a photoreceptor 222 that detects the intensity of the received light converged by the light receiving lens 221. When a position on the coordinate input surface 202 is specified by pointing that position with a pointing tool, the coordinate-position input device 200 detects the specified position in terms of its coordinates. The specified position is detected base on detection of the direction θ in which the light is blocked due to the invasion of the pointing tool in the light flux. By the way, the pointing tool may be a pen, finger or the like.

Structure of the light emitter will now be explained in detail here. FIG. 11A shows the conventional light emitter when viewed from the direction parallel to the coordinate input surface 202 and also from the direction perpendicular to the direction of travel of the irradiation light. In this light emitter, a positional relation between the light-emitting element 211 and the cylindrical lens 212 is so adjusted that the irradiation light travels parallel to the coordinate input surface 202. Precisely, the light-emitting element 211 is disposed at one focal point of the cylindrical lens 212. In other words, the light-emitting element 211 is so positioned that the light coming out of the cylindrical lens 212 is parallel to the optical axis of the light emitted from the light-emitting element 211. The reason why the light-emitting element 211 is positioned in this manner is as follows. That is, by positioning the light-emitting element 211 in this manner, if the collimated light beam is blocked by the pointing tool at some place, then the shadow of the pointing tool proceeds as it is without changing its shape because of the property of the collimated light beam. In other words, a sharp shadow of the pointing took fall on the photoreceptor. Conventionally, as shown in FIG. 11B, it was considered that, because the shadow of the pointing tool is sharp it appears as a dark spot on the photoreceptor, whereby the position of the pointing tool can be detected with highest precision.

On the other hand, in another conventional method, the cylindrical lens 212 and the light-emitting element 211 are so adjusted that the light coming out of the cylindrical lens 212 is not parallel but becomes narrower (that, is the light converges) as it reaches the recursive reflector 204 as shown in FIG. 12A. This method will be called as the method of converging the light to differentiate it from the above-explained method of parallel light. When the light is converging, since the irradiation light is not collimated light, due to diffraction or the like, the shadow of the pointing tool is not sharp. Accordingly, as shown in FIG. 12B, the negative peak of the intensity of the, corresponding to the position of the pointing tool is not very distinct, furthermore, the peak is not sharp. Because of these facts the precision in detection of the position of the pointing tool degrades.

An experiment was conducted as follows. FIG. 13A to FIG. 13B show detection characteristics of the coordinate-position input device observed in this experiment. The distance between the pointing tool and the coordinate input surface is plotted along the horizontal axis. The degree of detection precision (sensitivity of the photoreceptor) is plotted along the vertical axis. The lower the value of this degree of detection precision, the higher is the precision. The method of converging light explained with respect to FIG. 12A was employed in this experiment. Further, two pointing tools, one with a diameter of 5 mm and the other with a diameter of 20 mm were used to specify a position. FIG. 13A shows the detection characteristics when the direction θ of the pointing tool is zero degree. FIG. 13B shows the detection characteristics when the direction θ of the pointing tool is 20 degrees. Finally, FIG. 13C shows the detection characteristics when the direction θ of the pointing tool is 40 degrees. Each line in these plots shows the detection characteristics corresponding to the distance between the pointing tool and the light receiving lens 221. FIG. 14A to FIG. 14C correspond to FIG. 13A to FIG. 13C with the difference that the method of parallel light explained with respect to FIG. 11A was employed.

When the method of parallel light is employed, it is clear from FIG. 14A to FIG. 14C that, the precision of detection of the specified position increases as the distance between the pointing tool and the coordinate input surface decreases. Further, it is apparent that, the distance between the pointing tool and the light receiving lens 221, the direction θ, or the size of the pointing tool does not make any difference. In other words, if the method of parallel light is employed in the coordinate-position input device, then the specified position can be detected at a high precision. Furthermore, the detection characteristics depend only on the distance between the pointing tool and the coordinate input surface and does not depend on any other parameter.

On the contrary, when the method of converging light is employed, it is clear from FIG. 13A to FIG. 13C that, the detection precision is not uniform because it is affected by the distance between the pointing tool and the light receiving lens 221, the direction θ, or the size of the pointing tool. Particularly, the detection precision is low even if the pointing tool is brought very close (of the order of 1.0 mm) to the coordinate input surface.

As can be seen from the results of the experiments, the detection precision in the conventional coordinate-position input device is improved by employing the method of parallel light.

However, the conventional method has following problems. Consider that a whiteboard is used as a coordinate input surface, and some image is actually drawn with a pointing tool (for example, a pen) on the coordinate input surface. It is important that the precision in detection of the specified position is high when the pointing tool is touching the coordinate input surface. In other words, whether the coordinate-position input device is good or bad is determined in many cases according to how high the detection precision of input coordinates on the coordinate input surface is. However, as can be seen from FIG. 13A to FIG. 14C, the precession in detection of the specified position in the conventional coordinate-position input device is quite low when the distance between the pointing tool and the coordinate input surface is zero. Thus, there was a requirement of a coordinate-position input device with still higher detection precision as compared to the conventional one.

SUMMARY OF THE INVENTION

It is an object of this invention to provide a coordinate-position input device with improved precision in detection of a coordinate input position.

According to the coordinate-position input device of one aspect of this invention, the probe beam spreads along the coordinate input surface rather than being parallel or converging. Thus, when viewed from the side of the light receiver, the light is focused on it because the light is recursively reflected by the recursive reflector. Accordingly, precision in detection of a specified position when the pointing tool touches the coordinate input surface is improved.

According to the coordinate-position input device of another aspect of this invention, the coordinate-position input device has a light-emitting element that emits a probe beam to detect a coordinate input position and a refractive lens that refracts the probe beam emitted by the light-emitting element to be a beam flux to travel in a prescribed direction. Further, the light-emitting element is disposed at a location closer to the refractive lens than the focal point of the refractive lens. Thus, when viewed from the side of the light receiver, the light is focused on it because the light is recursively reflected by the recursive reflector. Accordingly, precision in detection of a specified position when the pointing tool touches the coordinate input surface is improved.

Other objects and features of this invention will become apparent from the following description with reference to the accompanying drawings.

BRIEF DESCRIPTION OF THE DRAWINGS

FIG. 4 schematically shows an internal structure of the light receiver when viewed from the direction perpendicular to the coordinate input surface;

FIG. 6 shows a relation between a specified position B, distance w between the light reception/emission sections, and angles θR and θL of the specified position B from the top edge of the coordinate input surface;

FIG. 11A shows the conventional light emitter when viewed from the direction parallel to the coordinate input surface and the direction at right angles to the direction of travel of the irradiation light, FIG. 11B shows a graph of the intensity of the received light;

DESCRIPTION OF THE PREFERRED EMBODIMENTS

Figure 1:
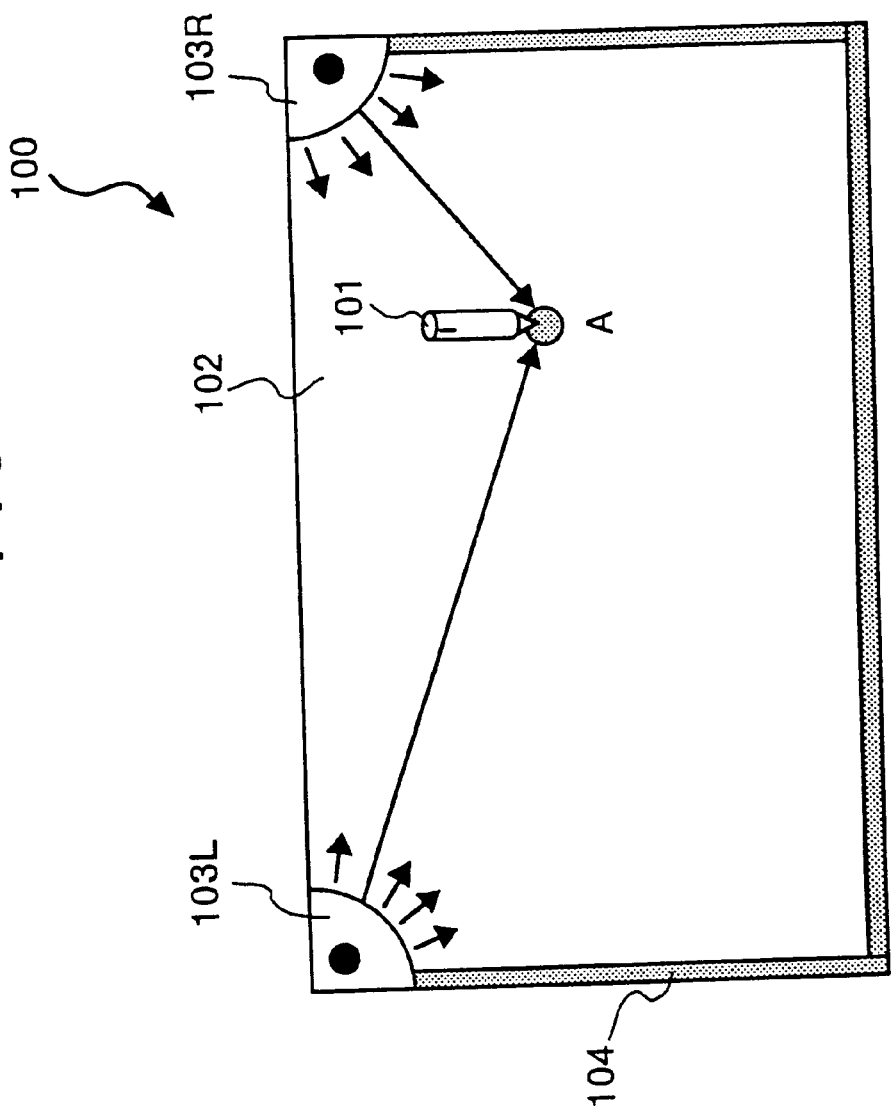
FIG. 1 schematically shows the structure of a coordinate-position input device according to this invention.

A preferred embodiment of this invention is explained in detail below with reference to the drawings. FIG. 1 schematically shows the coordinate-position input device according to the present invention. The coordinate-position input device 100 comprises a coordinate input surface 102 on which a position is specified (position A in the figure) with the pointing tool 101, a left-side light reception/emission section 103L that emits irradiation light along the coordinate input surface 102, and a right-side light reception/emission section 103R that emits irradiation light in a like manner. The pointing tool may be a pen or finger. The coordinate-position input device 100 further comprises a rectangular recursive reflector 104 that is disposed along three sides of the device. This recursive reflector 104 recursively reflects the irradiation light that has been emitted by the light reception/emission section 103L or the light reception/emission section 103R in a direction from where the light came in. The light reception/emission section 103L and the light reception/emission section 103R does not only emit light but also receive the light reflected by the recursive reflector 104. Further, the light reception/emission section 103L and the light reception/emission section 103R detect the intensity of the received light. The light reception/emission section 103L or the light reception/emission section 103R will collectively be referred to as the light reception/emission section 103 as necessary in the following explanation.

Figure 2A:
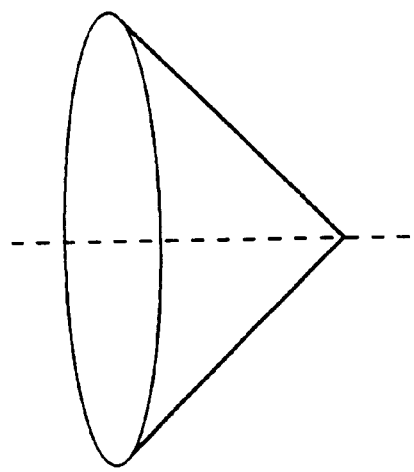
FIG. 2A and FIG. 2B show the structure of a corner cube reflector.
Figure 2B:
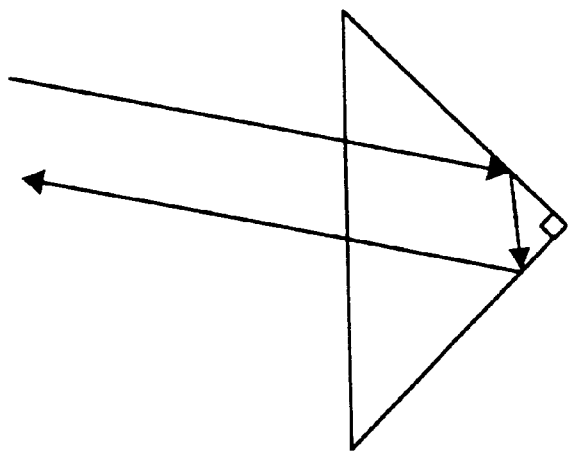

The surface of the recursive reflection section 104 is covered with a material that recursively reflects light. An example of this material is the corner cube reflector. FIG. 2A is a perspective view of the corner cube reflector and FIG. 2B is a cross-sectional view taken along the line passing through the top and the center of the circle of the bottom face. The corner cube reflector is conical in shape. Its internal surface is aluminum-evaporated, so that reflection efficiency is enhanced. As shown in these figures, the cone angle in this corner cube reflector 90 degrees. Therefore, incident light is recursively reflected.

Figure 3A:
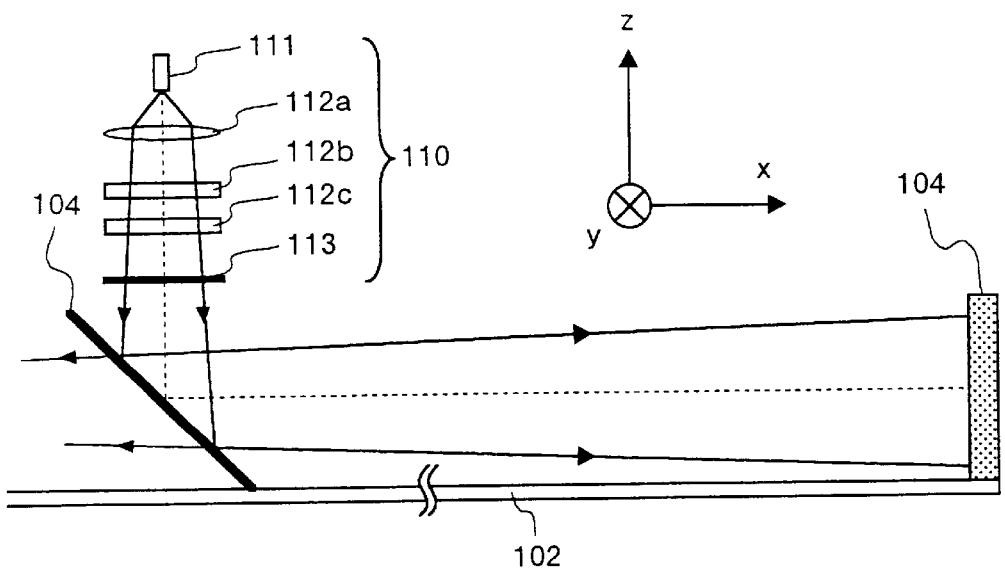
FIG. 3A and FIG. 3B show the structure and operation of the light emitter according to the present invention.
Figure 3B:
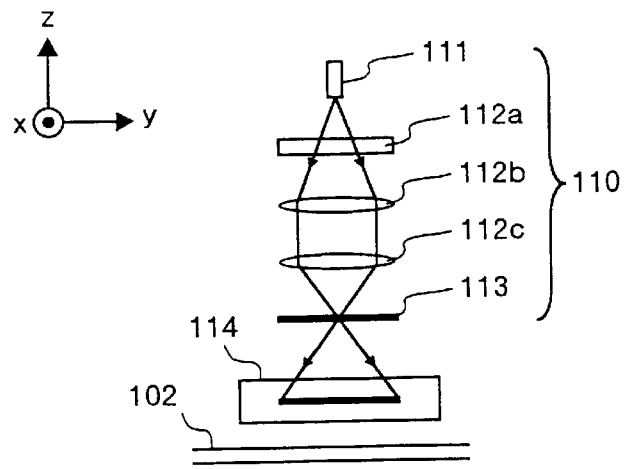

The structure of the light reception/emission section 103 will be explained here. The light reception/emission section 103 comprises a light emitter 110 that emits irradiation light, and a light receiver 120 that receives the light. FIG. 3A shows the light emitter 110 when viewed from the direction orthogonal to the direction of travel of the irradiation light within a plane parallel to the coordinate input surface 102 (that is, along the y axis). FIG. 3B shows the light emitter 110 when viewed from the direction of travel of the irradiation light (that is, along the x axis). The light emitter 110 comprises a light-emitting element 111 formed with a laser diode or a pin point LED that emits irradiation light, cylindrical lenses 112a to 112c that deflect the irradiation light emitted by the light-emitting element 111 to a prescribed direction, and a slit 113. A half mirror 114 reflects the irradiation light passing through the slit 113 toward the recursive reflection section 104.

The light emitted by the light-emitting element 111 is converged by the cylindrical lens 112a. This converged light is substantially collimated and made slightly wider in the xy plane and with a slight amount of spread in the negative direction of the z axis (see FIG. 3A). The irradiation light is then converged in the y-axial direction through the two cylindrical lenses 112b and 112c, and is focused to the location of the slit 113 (see FIG. 3B). The slit 113 has a fine and slit-like hole extending along the x axis. Accordingly, when the light passes through this slit 113, it spreads in a fan shape along the y axis. Thus, this slit 113 functions what is called a linear light source. The irradiation light spreads in a fan shape from this linear light source toward the coordinate input surface 102, and travels substantially parallel to the surface while the beam has some thickness and is slightly spreading in the direction perpendicular to the coordinate input surface 102 (that is, along the z axis). Thus, the irradiation light is substantially parallel to the coordinate input surface 102 and spreads in the direction perpendicular to the coordinate input surface 102.

FIG. 4 schematically shows an internal structure of the light reception section when viewed from the direction perpendicular to the coordinate input surface. Detection of reflection light within a two-dimensional plane parallel to the coordinate input surface 102 will be explained here to make the explanation simple. The light receiver 120 comprises a light receiving lens 121 that focuses light reflected by the recursive reflector 104 and a photoreceptor 122 formed with a photosensor or the like that detects the intensity of the received light. FIG. 4 also shows the light-emitting element 111 and the half mirror 114. The light-emitting element 111 is located above the half mirror 114 (the location indicated by z>0 in the coordinate system of the figure), therefore, the light-emitting element 111 is indicated here by a dot. The irradiation light irradiated from the light-emitting element 111 in the direction Lr is reflected by the recursive reflector 104, passes through the light-receiving lens 121, and reaches a position Lr' on the photoreceptor 122. Further, the irradiation light travelling along direction Ls is reflected by the recursive reflector 104, and reaches a position Ls' on the photoreceptor 122.

The reflected light, that is the light emitted from the light-emitting element 111 and reflected by the recursive reflector 104, returns along the same path, but falls on a different positions on the photoreceptor 122 due to the light-receiving lens 121. Accordingly, when the pointing tool 101 is inserted at a certain position on the coordinate input surface 102 and blocks the irradiation light, the reflection light does not reach the point on the photoreceptor 122 corresponding to its reflecting direction. Thus, by referring to a distribution of the light intensity on the photoreceptor 122, in which direction the irradiation light has been blocked can be determined.

Figure 5:
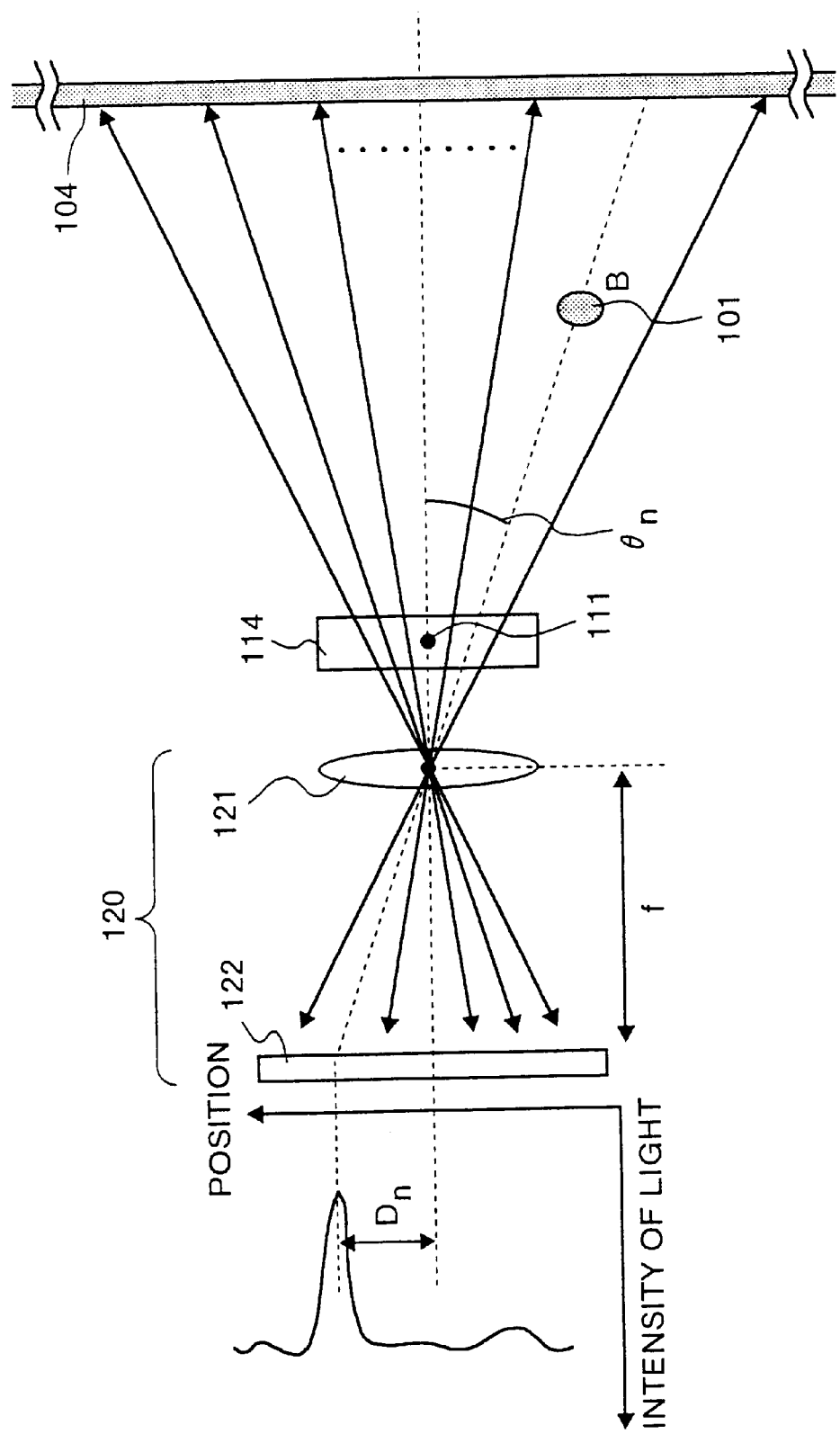
FIG. 5 shows a relation between reflected light and the intensity of the light received at the photoreceptor.

FIG. 5 shows a relation between reflected light and the intensity of received beams by the photoreceptor. The photoreceptor 122 is located on the surface of the focal point of the light-receiving lens 121. The intensity of the light received by the photoreceptor 122 is substantially constant in a portion where there is no pointing tool on the coordinate input surface 102. Consider that the pointing tool 101 is inserted in the coordinate input surface 102 at a position B (that is, the position B is specified with the pointing tool). Since the light will be blocked by the pointing tool, an area with low intensity of the received light beam (dark point) will appear in the position Dn on the photoreceptor 122 corresponding to the point B. This position Dn corresponds to the illuminating angle (incidence angle) θn of the blocked light one to one. Therefore, if the position Dn of the dark point on the photoreceptor 122 is obtained, the angle θn can be determined. Assuming the distance between the light-receiving lens 121 and the photoreceptor 122 to be f, θn can be obtained as follows:

$$\theta n = \arctan (Dn/f) \tag{1}$$

FIG. 6 shows a relation between a specified position B, distance w between the light reception/emission sections, and angles θR and θL of the specified position B from the top edge of the coordinate input surface. Let us represent θn and Dn corresponding to the light reception/emission section 103L as θnL and DnL, and represent θn and Dn corresponding the light reception/emission section 103R as θnR and DnR.

In general, the direction of a reference line to measure θn does not match the direction of a straight line connecting between the light reception/emission sections 103 of the coordinate input surface 100. That is, the directions θL and θR indicating the pointed position B based on the reference line connecting between the light reception/emission sections 103 in FIG. 6 are not the same as the directions θnL and θnR. However, θL and θR are correlated one-to-one through simple conversion using θnL and θnR although explanation of the difference is omitted here. Coordinates (x, y) of the specified position B can be obtained through the equation (2) from the obtained θL and θR, and distance w.

$$x = w \times \tan \theta R / (\tan \theta L + \tan \theta R)$$

$$y = w \times \tan \theta L \times \tan \theta R / (\tan \theta L + \tan \theta R) \tag{2}$$

As explained above, x and y can be calculated from DnL and DnR. Thus, by measuring the positions DnL and DnR of the dark point on the photoreceptor 122 based on the geometrical arrangement of the light reception/emission sections 103, the coordinates of the position B specified using the pointing tool 101 can be detected.

Figure 12A:
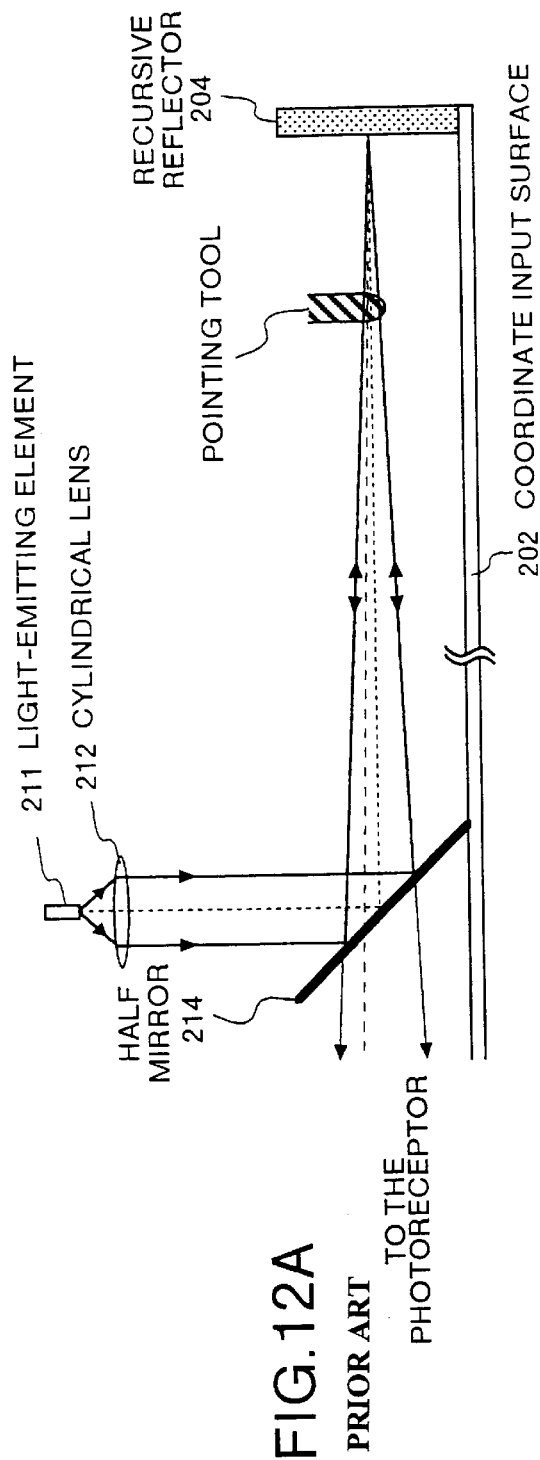
FIG. 12A shows the conventional light emitter when viewed from the direction parallel to the coordinate input surface and the direction at right angles to the direction of travel of the irradiation light.
Figure 12B:
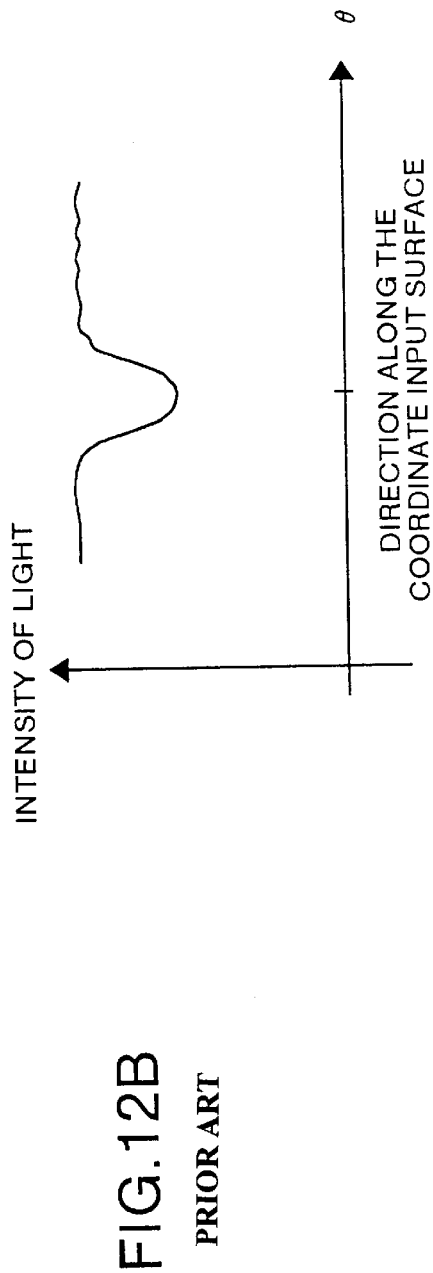
FIG. 12B shows a graph of the intensity of the received light.

A positional relation between the light-emitting element 111 and the cylindrical lens 112a in order to improve detection precision of the position of the blocked point (dark point) on the photoreceptor 122 will be explained below. In the conventional art explained in FIG. 11 and FIG. 12, the light-emitting element 111 is disposed at a location (at the focal point of the cylindrical lens) so that the irradiation light is parallel to the coordinate input surface 102. In the coordinate-position input device 100 according to this invention, the light-emitting element 111 is disposed at a location closer to the cylindrical lens 112a than the focal point of this lens. Accordingly, the irradiation light passing through the cylindrical lens 112a is travelling while keeping the substantially parallel relation with the coordinate input surface 102 yet gradually spreading, as shown in FIG. 3A.

Figure 7A:
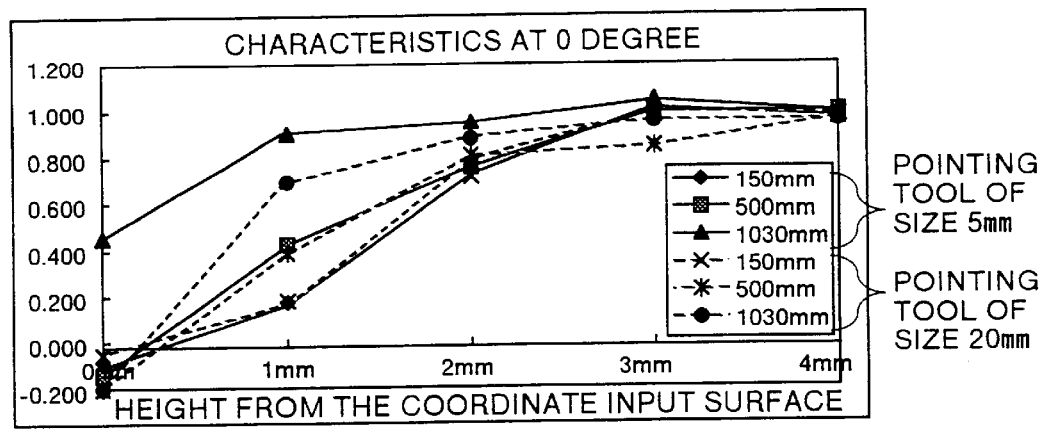
FIG. 7A to FIG. 7C show detection characteristics of the coordinate-position input device.
Figure 7B:
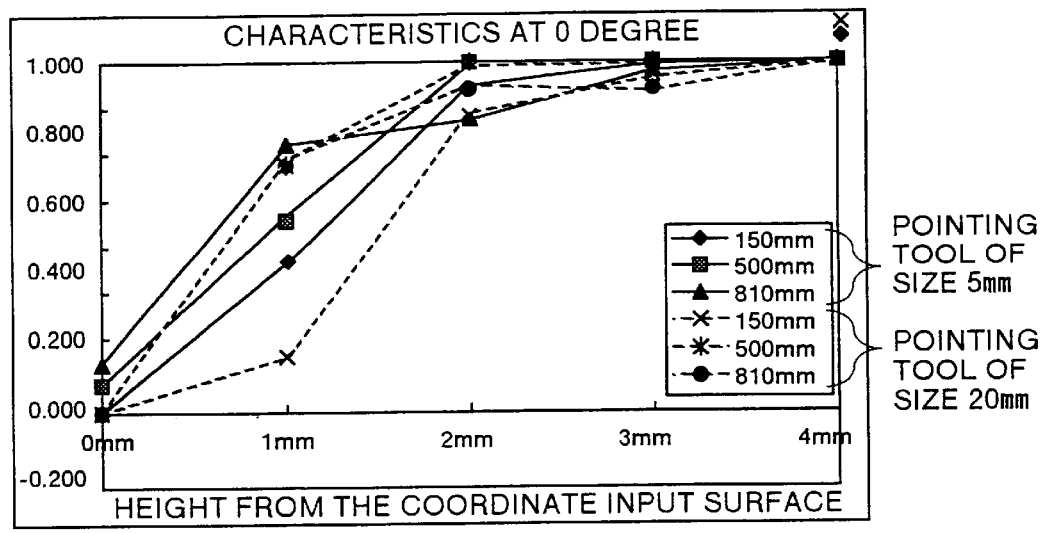
Figure 7C:
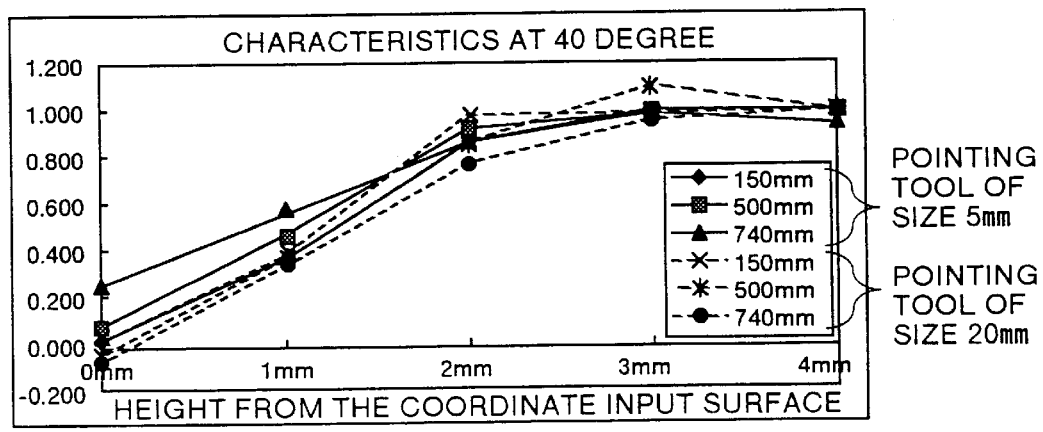
Figure 13A:
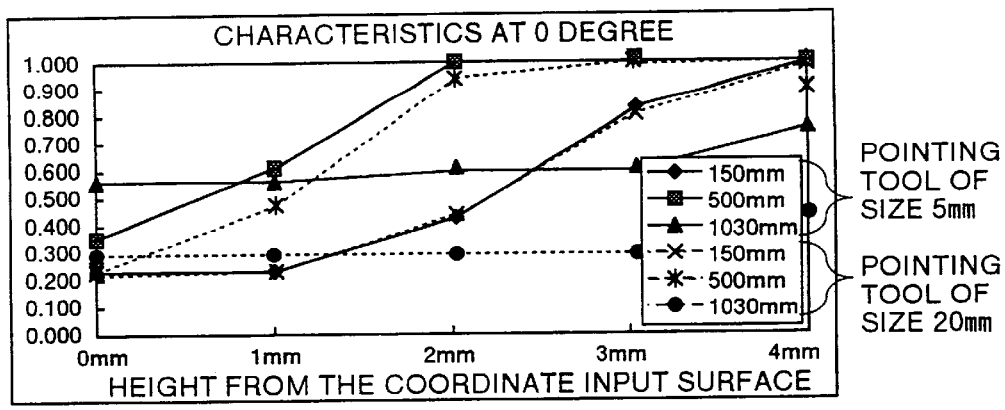
FIG. 13A to FIG. 13C show detection characteristics of the conventional coordinate-position input device at three different angles.
Figure 13B:
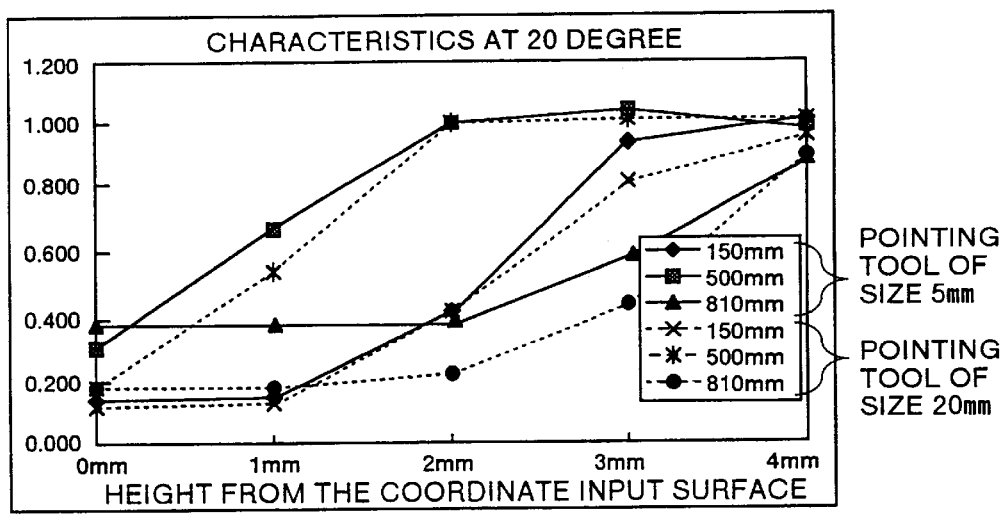
Figure 13C:
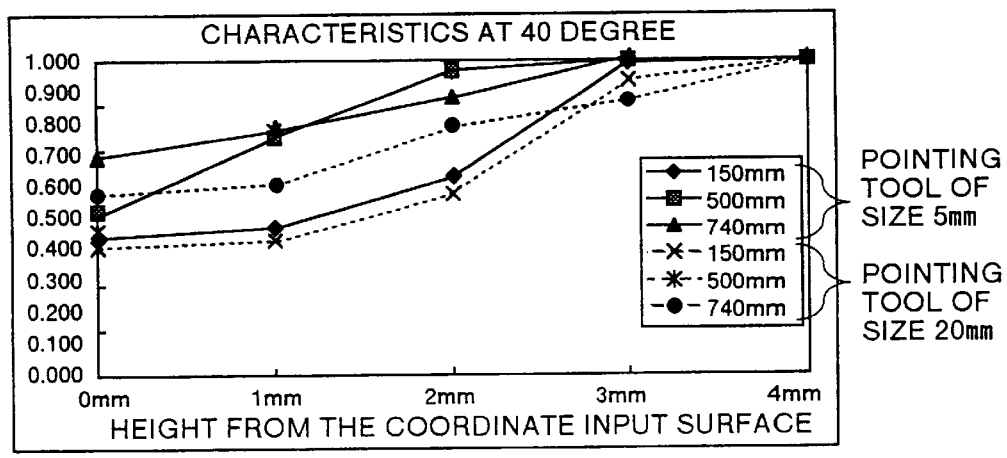
Figure 14A:
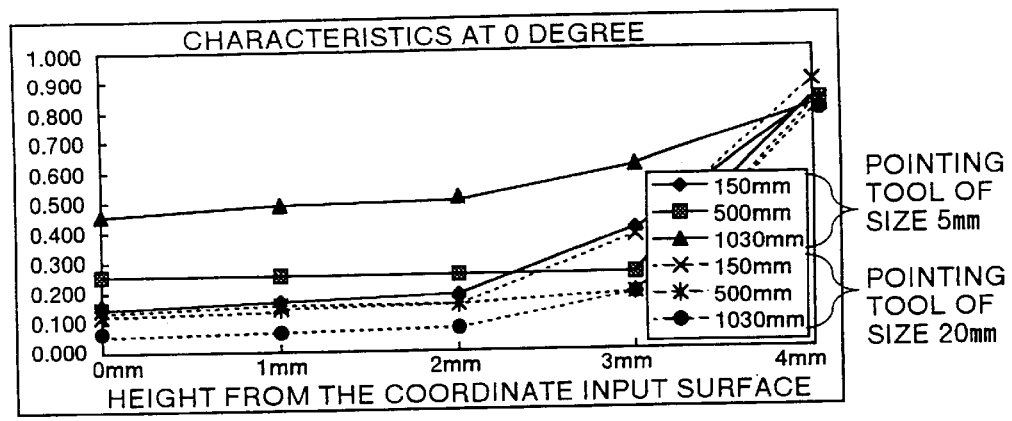
FIG. 14A to FIG. 14C show detection characteristics of the conventional coordinate-position input device at three different angles.
Figure 14B:
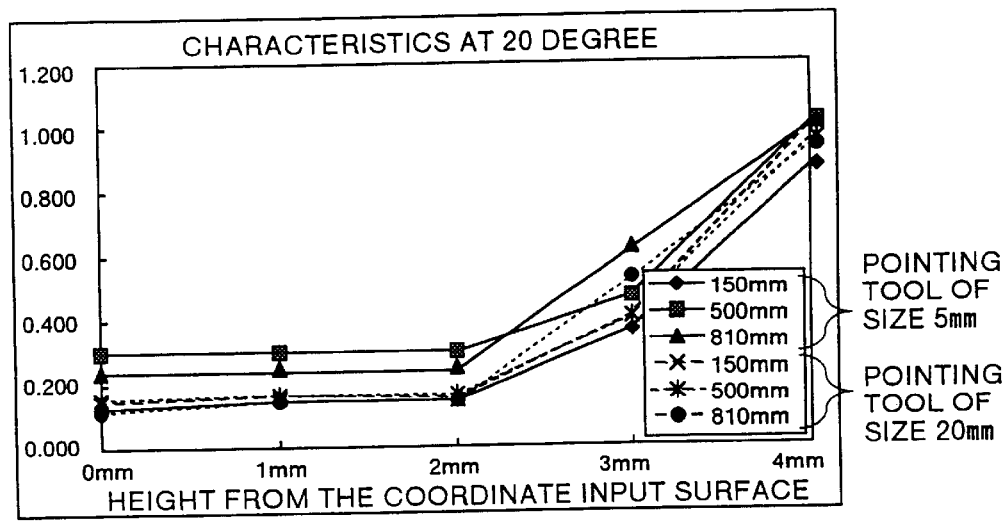
Figure 14C:
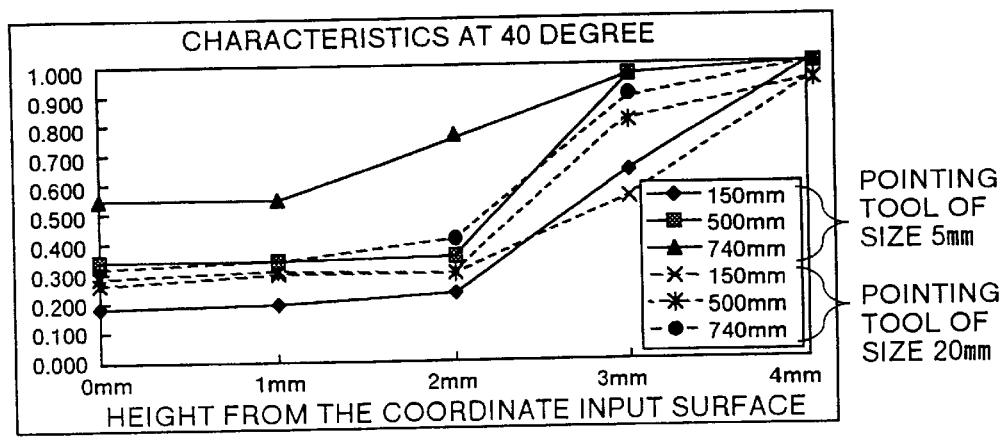

Detection characteristics of the coordinate-position input device 100 having the light emitter 110 that emits a light in a spreading manner (in contrast to parallel or converging light) were measured in an experiment. FIG. 7A to FIG. 7C show the results of this experiment. A comparison will be made between FIG. 7A to FIG. 7C, FIG. 13A to FIG. 13C, and FIG. 14A to FIG. 14C. The detection characteristics for various parameters (the size of the pointing tool, direction to which the rod blocks the beam, and distance between the light-receiving lens 121 and the pointing tool) exhibit a wide range of variations as compared to the case where the irradiation light is parallel to the coordinate input surface 102 (see FIG. 14). However, the detection characteristics exhibit a narrow range of variations as compared to the case where the irradiation light is getting converged (see FIG. 13). Thus, it can be said that the irradiation light as parallel light is more excellent from the viewpoint of setting of a threshold value for the photoreceptor 122 and setting of a detection range.

However, when the pointing tool touches the coordinate input surface 102 (the distance between the pointing tool and the coordinate input surface 102 is zero), in the coordinate-position input device 100 in which the light from the light emitter 110 spreads, the detection precision for any parameter is excellent.

The reason why the detection precision is improved may be explained as follows. Spreading of the irradiation light indicates that the light is being converged (being focused) to the light receiver 120 when viewed from the side of the light receiver 120 because the irradiation light is recursively reflected by the recursive reflector 104. Accordingly, it is considered that the detection precision of the blocked point is improved due to the higher light intensity.

In an actual case, the recursive reflector 104 does not properly reflect the light. For example, if there is a faulty point at some part of the recursive reflector 104 that fails to recursively reflect the irradiation light, precision in detection of coordinates may be reduced because the precision is largely affected by this faulty point when the irradiation light is not wide enough. However, when the irradiation light is spread like in the coordinate-position input device 100, the area of the recursive reflection section 104 which the irradiation light strikes is widened. Accordingly, there is an effect that the failed reflection occurring at some part of the recursive reflection section 104 can be compensated for with the remaining part of the widened area. Thus, the detection precision can be improved.

Although the cylindrical lenses are used in the light emission section for convenience in explanation, the lenses are not limited by these lenses, but various types of lenses may be used. The focal point in this case means the position at which the lens forms the sharpest image. In other words, the focal point indicates the position at which the lens focuses the light at its peak in intensity.

Figure 8:
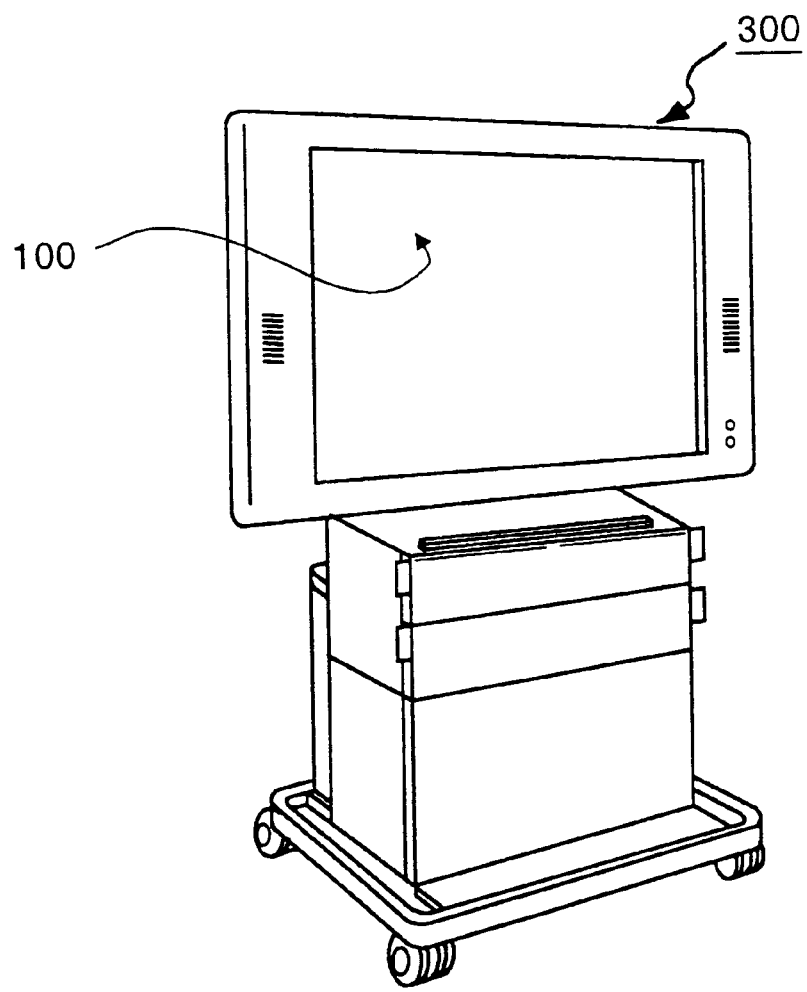
FIG. 8 shows an external view when the coordinate-position input device according to this invention is applied to a display board system.
Figure 9:
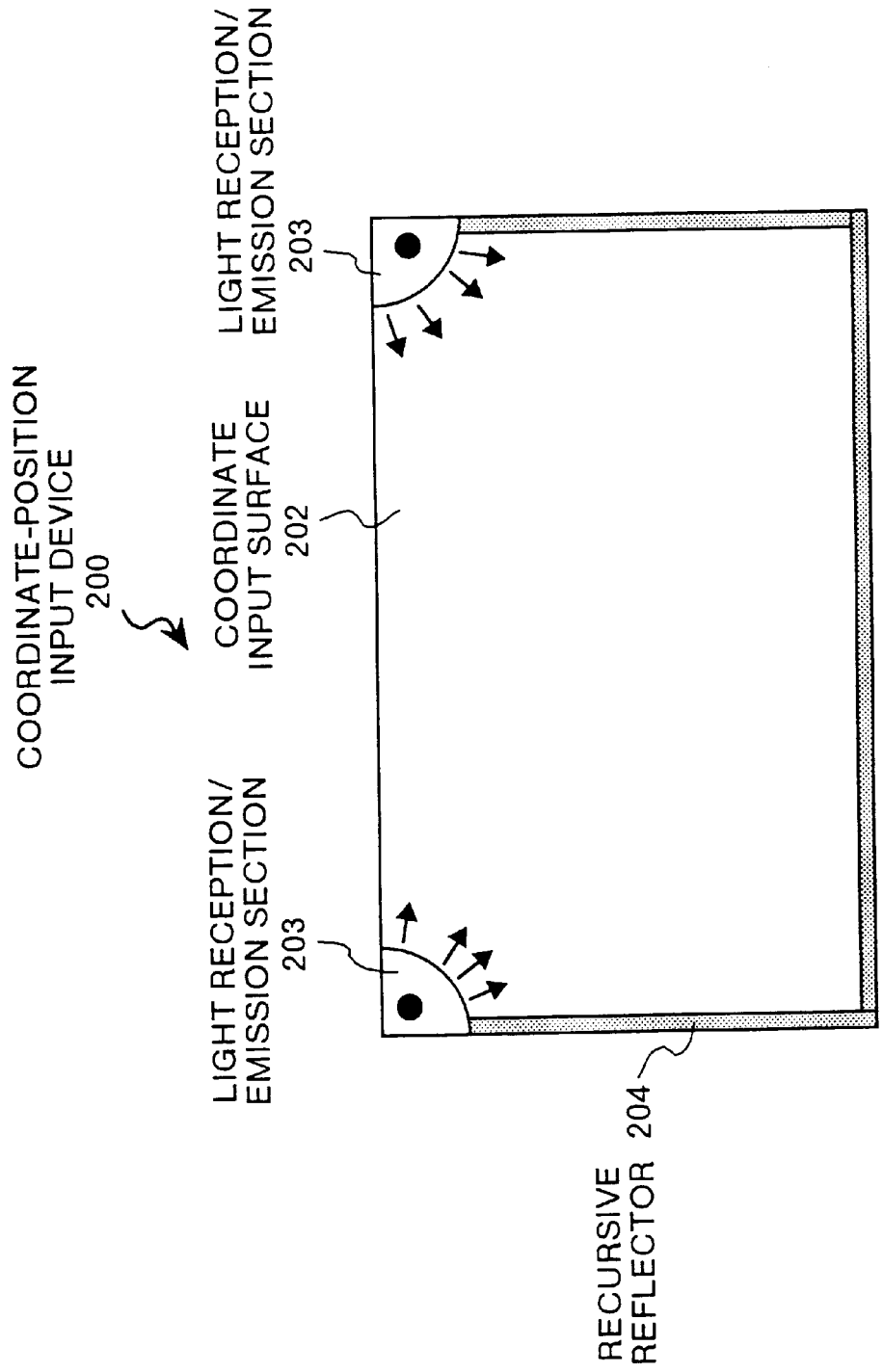
FIG. 9 schematically shows the conventional coordinate-position input device.
Figure 10:
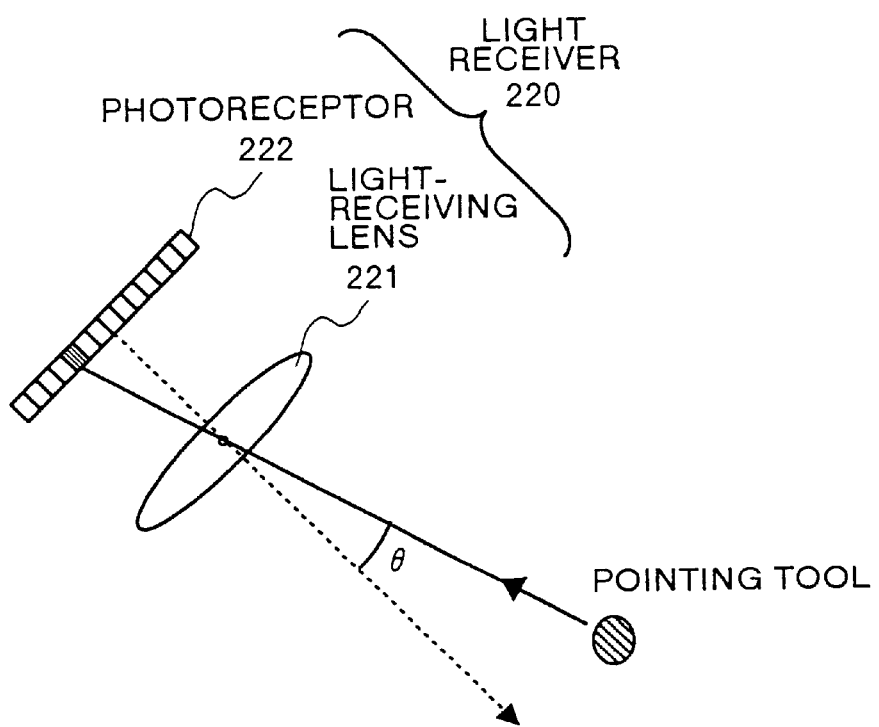
FIG. 10 schematically shows the conventional light receiver when viewed from the direction perpendicular to the coordinate input surface.

FIG. 8 shows an external view when the coordinate-position input device 100 according to this invention is applied to a display board system 300. The display board system 300 has a large-sized display unit (e.g., a plasma display) as shown in the figure, and the coordinate-position input device 100 of this invention is provided on the front surface of the display unit. When the coordinate-position input device 100 is applied in such a large-sized display unit, the detection precision of a coordinate input position is further improved.

As explained above, according to one aspect of this invention, the probe beam is substantially parallel to the coordinate input surface and spreads in the direction perpendicular to the coordinate input surface. Accordingly, it is possible to provide a coordinate-position input device with improved precision in detection of the specified position.

According to another aspect of this invention, the coordinate-position input device has a light-emitting element that emits a probe beam to detect a coordinate input position and a refractive lens that refracts the probe beam emitted by the light-emitting element to be a beam flux to travel in a prescribed direction. Further, the light-emitting element is disposed at a location closer to the refractive lens than the focal point of the refractive lens. Accordingly, it is possible to provide a coordinate-position input device with improved precision in detection of the specified position.

The present document incorporates by reference the entire contents of Japanese priority documents, 11-258077 filed in Japan on Sep. 10, 1999.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A coordinate-position input device based on an optical system which detects a coordinate input position by probe beams, wherein an optical axis of a probe beam is substantially parallel to a coordinate input surface and the probe beam, when propagating away from a source, diverges in a direction perpendicular to said coordinate input surface.

2. A coordinate-position input device comprising:
   a light-emitting element which emits a probe beam to detect a coordinate input position; and
   a refractive lens which refracts the probe beam emitted by said light-emitting element in a prescribed direction, wherein
   said light-emitting element is disposed at a location between said refractive lens and a first focal point of said refractive lens.

3. A coordinate-position input device comprising:
   a substantially flat surface configured to specify a desired position using a pointing tool;
   a reflecting member provided around said surface configured to reflect any light flux falling on the reflecting member;
   a light emitter which emits a flux of light of desired thickness over entire said surface towards said reflecting member, wherein the light flux is thicker near said reflecting member and becomes thinner and thinner as it goes away from said reflecting member;

a light receiver which receives the light reflected from said reflecting member and detects an intensity of the received light; and a calculating unit which calculates coordinates of a position specified on said surface based on the intensity of light detected by said light receiver.

4. The coordinate-position input device according to claim 3, wherein said surface is substantially rectangular in shape having four corners and four sides, one unit comprising said light emitter and said light receiver is provided at two adjacent corners of said surface, and said reflecting member is provided along all sides of said surface excluding a side which is in between said two corners where said light emitter and said light receiver are provided.

5. The coordinate-position input device according to claim 3, wherein said pointing tool is a rod-shaped member made of material which does not allow light to pass through.

6. The coordinate-position input device according to claim 3, wherein said light emitter comprises, a light source;

a lens which converges a light emitted from said light source into a light beam such that sides of said light beam diverge with respect to an optic axis of the light coming out of said lens; and a mirror which reflects the light beam coming out of said lens as a flux of light over entire said surface.

7. The coordinate-position input device according to claim 3, wherein said light emitter comprises, a light source;

a lens which converges a light emitted from said light source into a light beam, wherein said light source is located at a position which is nearer to said lens than a focal point of said lens; and a mirror which reflects the light beam coming out of said lens as the flux of light over entire said surface.

8. A method of detecting coordinates of a specified position comprising:

emitting a flux of light of a desired thickness over a substantially flat surface towards a reflecting member, which flat surface is used to specify a desired position with a pointing tool, wherein the light flux is thicker near said reflecting member and becomes thinner and thinner as it goes away from said reflecting member;

collecting at two places a light flux reflected by said reflecting member and detecting an intensity of the light coming from different directions and detecting two directions in which the intensity of the light is substantially less as compared to other directions; and calculating coordinates of the specified position based on an intersection point of said two directions in which the intensity of the light is substantially less and a distance between said two places at which the light flux reflected by said reflecting member is collected.

9. The method of detecting coordinates of the specified position according to claim 8, wherein said pointing tool is a rod-shaped member made of material which does not allow, light to pass through.

* * * * *